(12) United States Patent
Betsuno et al.

(10) Patent No.: US 11,880,566 B2
(45) Date of Patent: *Jan. 23, 2024

(54) STORAGE SYSTEM AND CONTROL METHOD OF STORAGE SYSTEM INCLUDING A STORAGE CONTROL UNIT THAT PERFORMS A DATA AMOUNT REDUCTION PROCESSING AND AN ACCELERATOR

(71) Applicant: Hitachi, Ltd., Tokyo (JP)

(72) Inventors: Kenichi Betsuno, Tokyo (JP); Takashi Nagao, Tokyo (JP); Yuusaku Kiyota, Tokyo (JP); Tomohiro Yoshihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,255

(22) Filed: Mar. 11, 2022

(65) Prior Publication Data

US 2022/0308761 A1 Sep. 29, 2022

Related U.S. Application Data (63) Continuation of application No. 17/469,968, filed on Sep. 9, 2021, now Pat. No. 11,287,977.

(30) Foreign Application Priority Data

Mar. 29, 2021 (JP) ................................. 2021-055362

(51) Int. Cl.
*G06F 3/06* (2006.01)

(52) U.S. Cl.
CPC ............ *G06F 3/0604* (2013.01); *G06F 3/065* (2013.01); *G06F 3/0659* (2013.01); *G06F 3/0673* (2013.01)

(58) Field of Classification Search
CPC ...... G06F 3/0604; G06F 3/065; G06F 3/0659; G06F 3/0673; G06F 3/0608;
(Continued)

(56) References Cited

U.S. PATENT DOCUMENTS

| 8,266,342 B1 | 9/2012 | Takada et al. |
| 2008/0162662 A1* | 7/2008 | Fujita ................. G06F 11/1464 706/46 |

(Continued)

FOREIGN PATENT DOCUMENTS

| JP | 2014-504749 A | 2/2014 |
| JP | 2018-537765 A | 12/2018 |

(Continued)

OTHER PUBLICATIONS

Japanese Office Action received in corresponding Japanese Application No. 2023-021560 dated Dec. 5, 2023.

*Primary Examiner* — Rocio Del Mar Perez-Velez
*Assistant Examiner* — Tong B. Vo
(74) *Attorney, Agent, or Firm* — Mattingly & Malur, PC (57) ABSTRACT

Provided is a storage system including a plurality of controllers. The storage system adopts a write-once data storage system and can implement high Input/Output (I/O) processing performance while ensuring data consistency when a failure occurs. Before metadata duplication, recovery data including information necessary for performing roll forward or roll back is stored in each controller, and then the metadata duplication is performed. A recovery data storage processing and the metadata duplication are offloaded to a hardware accelerator.

14 Claims, 11 Drawing Sheets

(58) Field of Classification Search
CPC ........ G06F 3/0641; G06F 3/067; G06F 3/061; G06F 3/0614; G06F 3/0656; G06F 12/0802
See application file for complete search history.

(56) References Cited

U.S. PATENT DOCUMENTS

| | | | |
|---|---|---|---|
| 2015/0363319 A1* | 12/2015 | Qi | G06F 3/0619 |
| | | | 711/121 |
| 2016/0062685 A1* | 3/2016 | Sundararajan | G06F 3/065 |
| | | | 711/162 |
| 2017/0300250 A1* | 10/2017 | Sterns | G06F 3/0683 |
| 2018/0356979 A1* | 12/2018 | Yu | G06F 3/061 |
| 2019/0073283 A1* | 3/2019 | Chen | G06F 11/1441 |
| 2020/0293220 A1* | 9/2020 | Lu | H04L 67/1097 |
| 2021/0042050 A1* | 2/2021 | Schauer | G06F 3/0647 |
| 2021/0263678 A1* | 8/2021 | Glimcher | G06F 3/0659 |
| 2021/0278977 A1* | 9/2021 | Patel | G06F 3/0641 |
| 2021/0286537 A1* | 9/2021 | Shveidel | G06F 3/061 |
| 2021/0311633 A1* | 10/2021 | Bates | G06F 3/0673 |
| 2021/0318818 A1* | 10/2021 | Lathrop | G06F 3/0604 |
| 2022/0156287 A1* | 5/2022 | Zhang | G06F 3/0659 |

FOREIGN PATENT DOCUMENTS

| | | |
|---|---|---|
| JP | 2020-112972 A | 7/2020 |
| WO | 2017/081593 A1 | 5/2017 |

\* cited by examiner

205: LDEV MANAGEMENT TABLE

| LDEV ID | LDEV ATTRIBUTE | METADATA MANAGEMENT TABLE ID |
|---|---|---|
| 0x0000 | THIN PROVISIONING | 0X0000 |
| 0x0001 | COMPRESSION ENABLED | 0x0001 |
| 0x0002 | NORMAL LDEV | 0x0002 |
| ... | ... | ... |

206: METADATA MANAGEMENT TABLE

| LOGICAL ADDRESS | PHYSICAL ADDRESS | SIZE AFTER COMPRESSION |
|---|---|---|
| 0x0000 | 0x0100 | 4KB |
| 0x0010 | 0x0200 | 2KB |
| ... | ... | ... |

FIG. 5

207: RECOVERY DATA MANAGEMENT TABLE

| LOGICAL ADDRESS | PHYSICAL ADDRESS | SIZE AFTER COMPRESSION | ENABLE FLAG | METADATA STORAGE DESTINATION ADDRESS (OWN-SYSTEM) | METADATA STORAGE DESTINATION ADDRESS (OTHER-SYSTEM) |
|---|---|---|---|---|---|
| 0x0000 | 0x0100 | 4KB | DISABLED | 0x1100 | 0x2000 |
| 0x0010 | 0x0200 | 2KB | ENABLED | 0x1110 | 0x2010 |
| ... | ... | ... | ... | ... | ... |

*FIG. 7*

FIG. 8
DESTAGE PROCESSING

FIG. 9
DATA AMOUNT REDUCTION PROCESSING

FIG. 11

STORAGE SYSTEM AND CONTROL METHOD OF STORAGE SYSTEM INCLUDING A STORAGE CONTROL UNIT THAT PERFORMS A DATA AMOUNT REDUCTION PROCESSING AND AN ACCELERATOR

CLAIM OF PRIORITY

The present application claims priority from Japanese patent application JP 2021-055362 filed on Mar. 29, 2021, the content of which is hereby incorporated by reference into this application.

BACKGROUND OF THE INVENTION

1. Field of the Invention

The present invention relates to a storage system.

2. Description of the Related Art

As methods for reducing costs of storage media in storage systems, data reduction techniques such as a data compression technique and a deduplication technique are widely used. When these data reduction techniques are applied, there is a difference between a size of data written into a storage system by a host and a size of data actually written into a storage medium. Therefore, in order to effectively use a storage area of the storage medium, a write-once data storage method (e.g., log-structured storage) is used in which data after data reduction is applied is written in a forward shifting manner.

In addition, a storage system equipped with a plurality of controllers in order to increase redundancy is widely used. In such a storage system, even when a failure occurs in one of the controllers, it is necessary to maintain consistency of recorded user data. As a method for implementing data consistency, a technique called cache memory duplication is widely used. This is a method in which, when the storage system receives a write request, received user data is stored in cache memories of other controllers in addition to a cache memory of a controller responsible for processing the write request, and then a completion response is returned to the host. By this method, even when a failure occurs in one controller, data consistency can be maintained since the user data is stored in other controllers. However, the duplication of the cache memory is accompanied by a data transfer processing between controllers, and thus a CPU load is increased and I/O performance of the storage system is lowered. In order to reduce the CPU load, it is considered to use a method for offloading execution of the user data transfer processing from a CPU to dedicated hardware.

As a technique of offloading the user data transfer processing by hardware, for example, a technique described in JP-T-2014-504749 (PTL 1) is known. PTL 1 discloses a technique in which a sequencer for controlling data transfer using hardware is introduced to collectively offload transfer processing of a plurality of user data and reduce a CPU load.

SUMMARY OF THE INVENTION

With the write-once data storage method, a correspondence relationship between a logical address of the user data and a position where data is actually physically stored (physical address) is variable. Therefore, it is necessary for the storage system to record the correspondence relationship between the logical address and the physical address as metadata in addition to the user data written from the host. In addition, in the storage system equipped with a plurality of controllers, it is necessary to duplicate metadata on cache memories of the plurality of controllers in order to maintain the data consistency between controllers. Further, even when a failure (e.g., disconnection between controllers) occurs in the storage system during execution of a duplication processing, it is necessary to maintain metadata consistency between the controllers.

One aspect of the invention for solving at least one of the above problems provides a storage system including: a plurality of storage control units, an accelerator, and a storage drive having a storage medium for storing data. Each of the plurality of storage control units includes a processor and a memory. Metadata for accessing the data stored in the storage drive is held in a memory of a first storage control unit among the plurality of storage control units and a memory of a second storage control unit among the plurality of storage control units. When a write request for updating the stored data is received, a processor of the first storage control unit generates metadata obtained by updating metadata related to the data to be updated and recovery data including information for recovering metadata consistency, and transmits a processing request for the metadata and the recovery data to the accelerator. The accelerator stores the recovery data in the memory of the first storage control unit and the memory of the second storage control unit based on the processing request and then stores the metadata in the memory of the first storage control unit and the memory of the second storage control unit.

According to the aspect of the invention, in the storage system adopting the write-once data storage method, it is possible to improve I/O processing performance while maintaining data consistency.

Problems, configurations, and effects other than those described above will be clarified by describing the following embodiments.

DESCRIPTION OF THE PREFERRED EMBODIMENTS

Hereinafter, embodiments of the invention will be described with reference to the accompanying drawings. In the accompanying drawings, functionally identical elements may be denoted by the same numerals. The accompanying drawings show specific embodiments and examples in accordance with the principle of the invention. These embodiments and examples are provided to understand the invention, and should not be construed as limiting the scope of the invention.

In the following description, when the same type of elements are described without being distinguished from each other, a reference numeral common among reference numerals may be used; when the same type of elements are distinguished from each other, reference numerals (or IDs (e.g., identification numbers) of elements) may be used. For example, when a plurality of storage controllers are not distinguished from each other, the storage controllers are described as "storage controllers 22"; when the storage controllers are distinguished from each other, the storage controllers are described as a "storage controller 1_22A" and a "storage controller 2_22B". The same applies to other elements (e.g., a cache area 203 and a buffer area 202).

In addition, elements belonging to the storage controller 1_22A and the storage controller 2_22B are respectively distinguished by "A" and "B" attached to the reference numerals, such as describing a CPU 24 as a CPU 24A.

In the present embodiment, a method for maintaining metadata consistency by roll forward when a failure occurs will be described.

Figure 1:
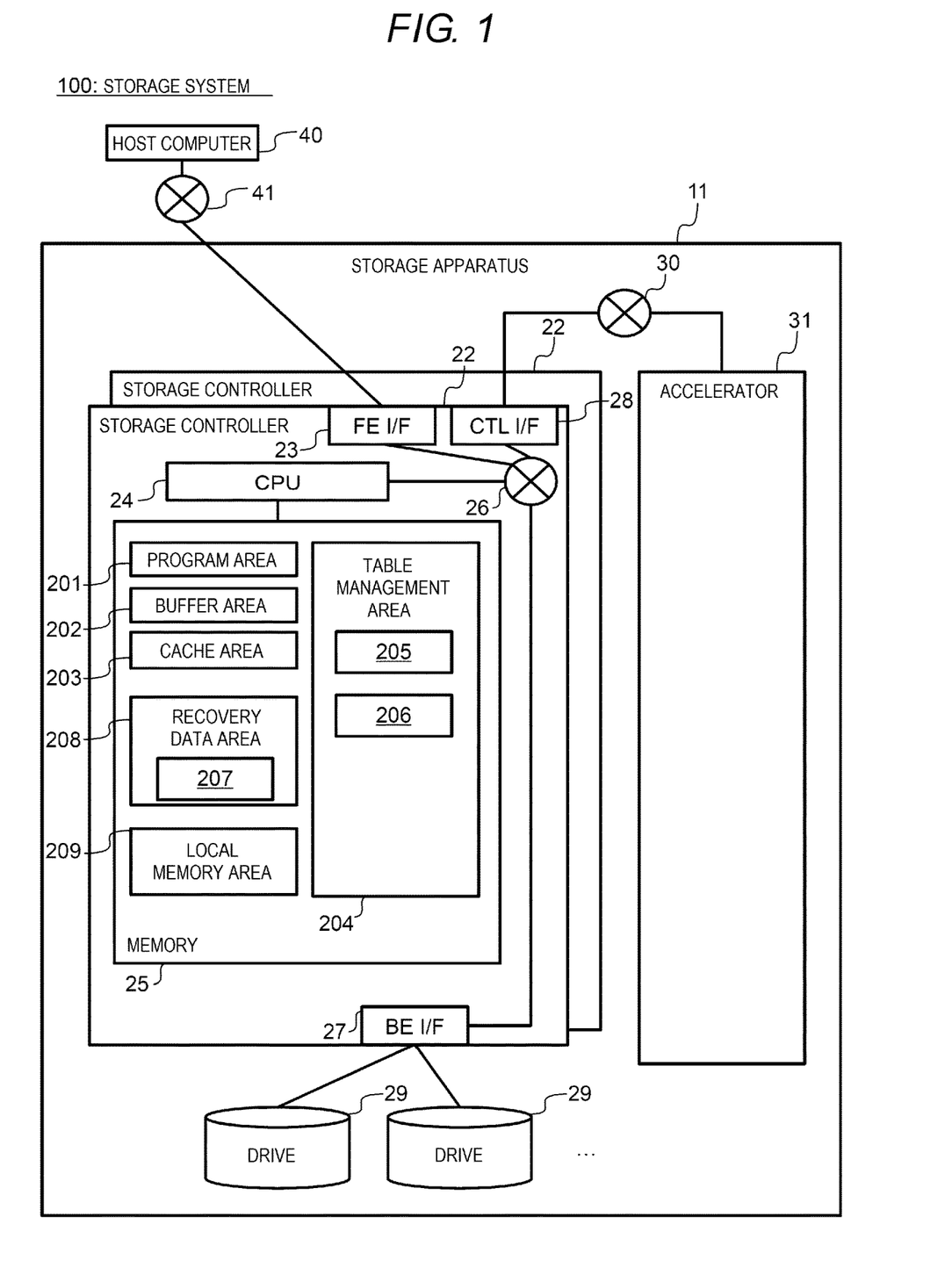
FIG. 1 is a diagram showing an outline of a storage system according to an embodiment of the invention.

FIG. 1 is a diagram showing an outline of a storage system 100 according to the embodiment of the invention. The storage system 100 includes a storage apparatus 11 and a host computer 40 connected to the storage apparatus 11. The host computer 40 is connected to the storage apparatus 11 via a network 41. The host computer 40 may be a physical computer or a virtual computer executed on a physical computer. The host computer 40 may also be a virtual computer executed in the storage system 100.

The storage apparatus 11 includes two or more storage controllers 22, one or more accelerators 31, a plurality of drives 29 each connected to one or more storage controllers 22, and a network 30 that connects the storage controllers 22 and the accelerator 31.

The storage controller 22 includes a front-end interface device (FE_I/F) 23 that communicates with the host computer, a CPU 24 that controls the entire storage controller 22, a memory 25 that stores programs and information used by the CPU 24, a back-end interface device (BE_I/F) 27 that communicates with the drives 29, an inter-controller interface (CTL_I/F) 28 that connects the storage controller 22 via the network 30, and an internal network 26 that connects these components.

The memory 25 includes a program area 201 for storing programs, a buffer area 202 that is a temporary data storage area at the time of data transfer and data copy, a cache area 203 for temporarily storing write target data from the host computer 40 (data written in response to a write request from the host computer 40), read target data from the drives 29 (data read in response to a read request from the host computer 40), and metadata, a table management area 204 for storing various tables, a recovery data area 208 for storing information for roll forward or roll back of metadata, and a local memory area 209 used for data exchange between the CPU 24 and the accelerator 31.

The table management area 204 stores a logic device (LDEV) management table 205 that holds information on LDEV, and a metadata management table 206 that holds metadata information. Here, the LDEV refers to a logical storage device managed by the storage system.

The recovery data area 208 stores a recovery data management table 207 for recording information necessary for the roll forward or the roll back in order to recover consistency of duplicated metadata when a metadata update fails.

The drive 29 is a device having a nonvolatile data storage medium, and may be a solid state drive (SSD) or a hard disk drive (HDD). A plurality of drives 29 may form a plurality of redundant array of independent disk (RAID) groups including one or more drives 29.

Figure 2:
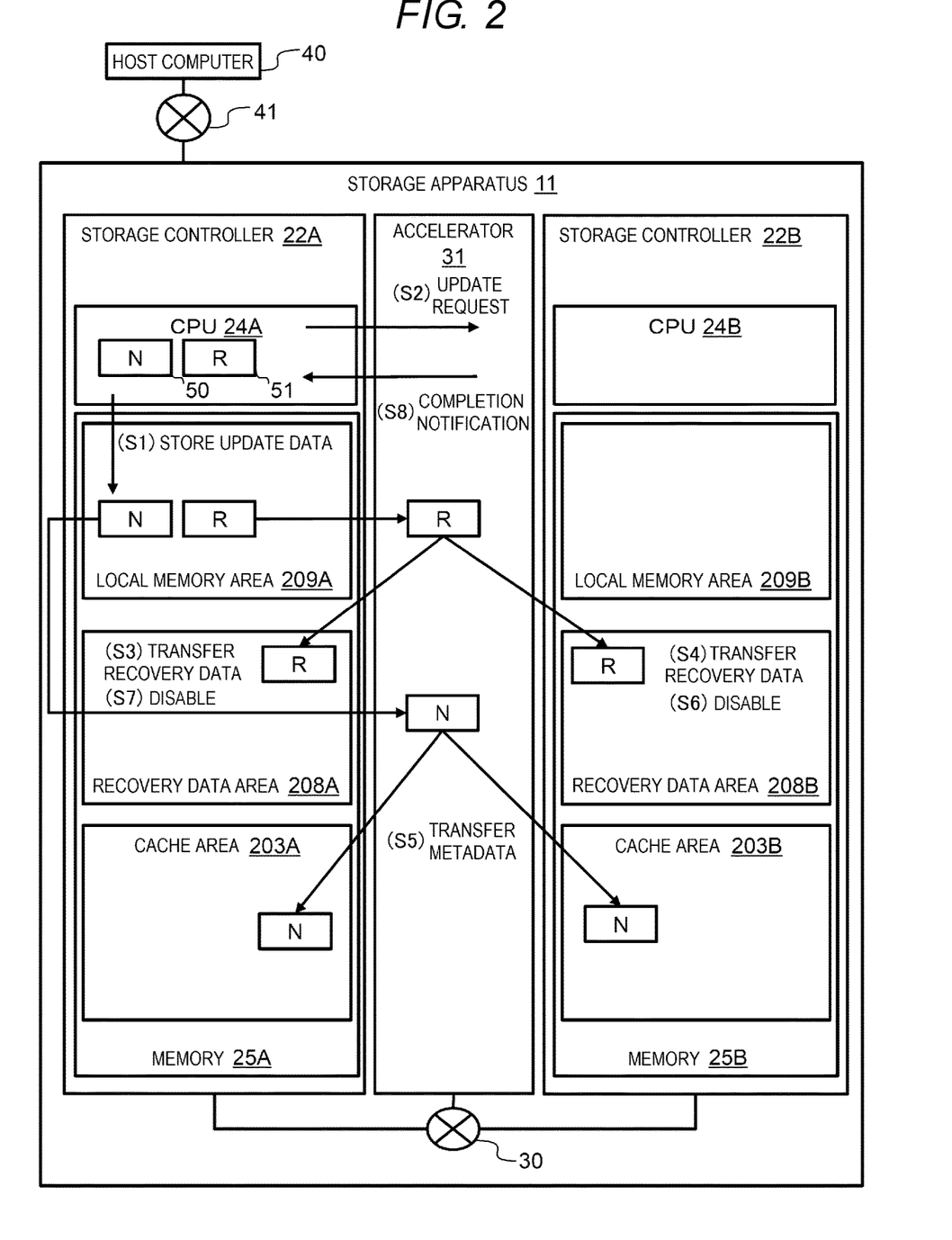
FIG. 2 is a diagram showing an outline of a metadata update processing according to the embodiment of the invention.

FIG. 2 is a diagram showing an outline of a metadata update processing according to the embodiment of the invention.

Here, as an example, processing in which a storage controller 22A transfers updated metadata 50 to a cache area 203A of the storage controller 22A and a cache area 203B of a storage controller 22B will be described.

Here, recovery data 51 corresponds to an entry of the recovery data management table 207 to be described later. The recovery data 51 includes backup data of the updated metadata 50, an enable flag, a metadata storage destination address of the controller 22A, and a metadata storage destination address of the controller 22B.

S1: The CPU 24A stores the updated metadata 50 and the recovery data 51 in the local memory area 209. At this time, the CPU 24A sets a value of the enable flag of the recovery data 51 to "enabled".

S2: The CPU 24A issues a metadata update processing request to the accelerator 31.

S3: Upon receiving the metadata update processing request, the accelerator 31 reads the recovery data 51 from a local memory area 209A and stores the recovery data 51 in a recovery data area 208A of the storage controller 22A.

S4: The accelerator 31 reads the recovery data 51 from the local memory area 209A and stores the recovery data 51 in a recovery data area 208B of the storage controller 22B.

S5: The accelerator 31 reads the updated metadata 50 from the local memory area 209A, and stores the updated metadata 50 in the cache area 203A of the storage controller 22A and the cache area 203B of the storage controller 22B.

S6: The accelerator 31 rewrites the value of the enable flag of the recovery data 51 stored in the recovery data area 208B to "disabled". The enable flag is used to determine an update status of the metadata when the recovery processing of the metadata is required. When the recovery data 51 is "disabled", it can be determined that the metadata update of the storage controller 22B is completed. On the other hand, when the recovery data is "enabled", the metadata update of the storage controller 22B may have not been completed. At this time, the metadata consistency is recovered by performing roll forward of the metadata using the backup data of the metadata recorded in the recovery data 51.

S7: The accelerator 31 rewrites the value of the enable flag of the recovery data 51 stored in the recovery data area 208A to "disabled". As in step S6, when the recovery processing of the metadata is necessary, the role forward processing of the metadata of the storage controller 22A is performed based on the enable flag of the recovery data 51, and the metadata consistency is recovered.

S8: The accelerator 31 sends a completion notification to the storage controller 22A.

<LDEV Management Table>

Figure 3:
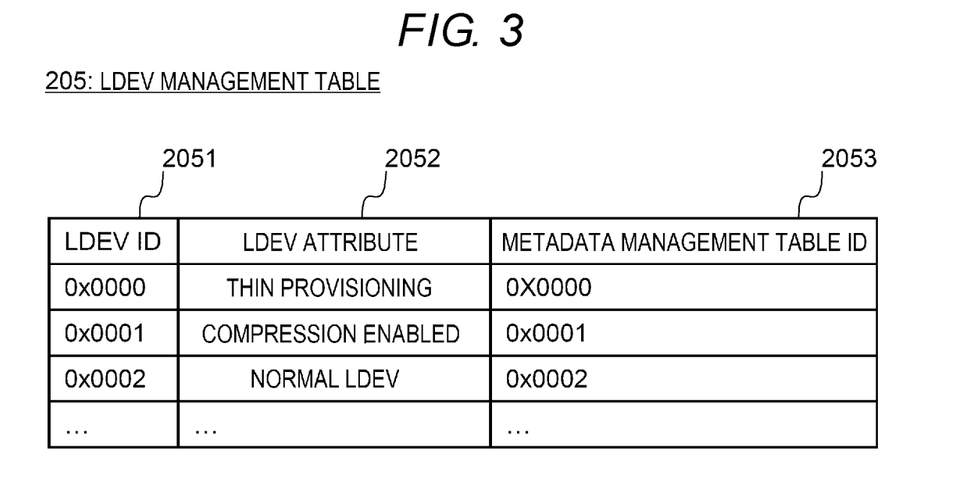
FIG. 3 is a diagram showing an LDEV management table according to the embodiment of the invention.

FIG. 3 is a diagram showing the LDEV management table 205 according to the embodiment of the invention.

Each entry of the LDEV management table 205 corresponds to each LDEV present in the storage system, and records management information on the corresponding LDEV.

Hereinafter, each column of the LDEV management table 205 will be described.

A column 2051 records an identifier (LDEV ID) assigned to a LDEV.

A column 2052 records an attribute of the corresponding LDEV (e.g., whether a target LDEV is a VOL to which thin provisioning is applied, a normal VOL, whether a capacity reduction function is enabled).

A column 2053 records information indicating which metadata management table 206 the LDEV corresponds to. For example, the column 2053 records an ID assigned to each metadata management table 206.

<Metadata Management Table>

Figure 4:
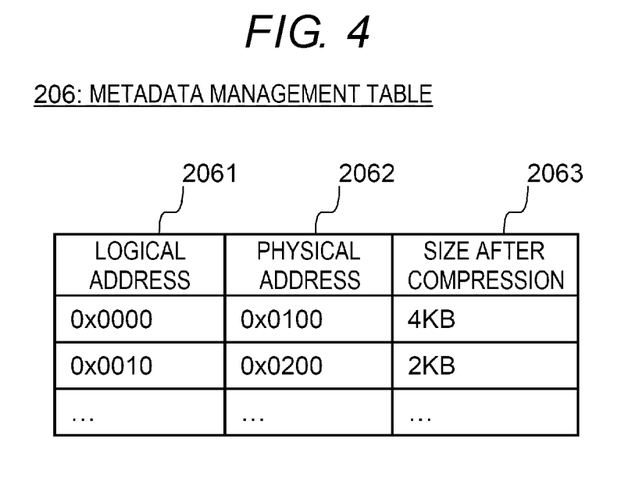
FIG. 4 is a diagram showing a metadata management table according to the embodiment of the invention.

FIG. 4 is a diagram showing the metadata management table 206 according to the embodiment of the invention.

In the write-once data storage method, data is stored not to generate a gap in a storage area of the drive 29. Therefore, a correspondence relationship between a logical address of user data and a physical address (an address indicating a data storage location in the drive) does not match. Therefore, to access data of a specified logical address, it is necessary for the storage apparatus 11 to manage the correspondence relationship between the logical address and the physical address of each data.

Each entry of the metadata management table 206 records a correspondence relationship between a logical address in a LDEV where user data is stored and a physical address indicating a position where data is actually stored. Hereinafter, each column of the metadata management table 206 will be described.

A column 2061 records a logical address in the LDEV where the user data is stored.

A column 2062 records a physical address indicating the position where the user data is actually stored in the drive 29.

A column 2063 records a size of compressed data. When the compression for the target data is not performed, a disabled value is set.

In order to improve the efficiency of in-table search, the metadata management table 206 may be divided into tables for each LDEV, for example. In the following description, it is assumed that the metadata management table 206 is divided for each LDEV.

<Recovery Data Management Table>

Figure 5:
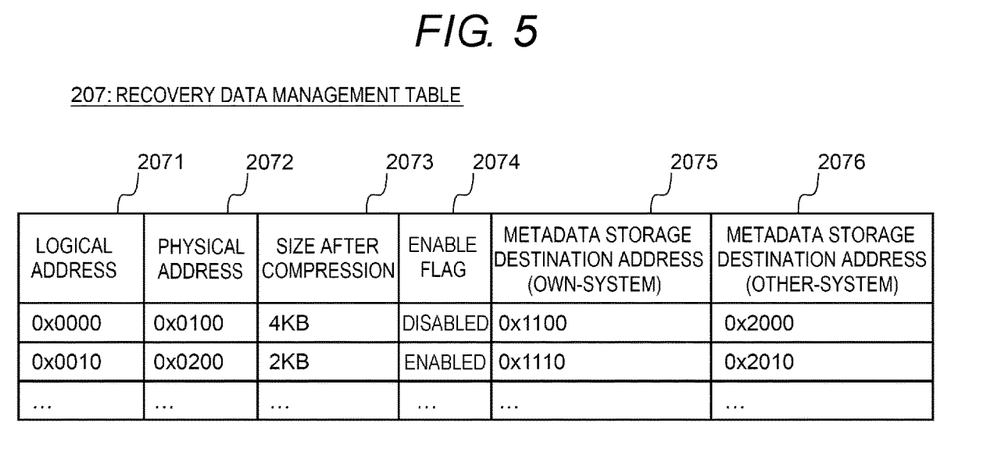
FIG. 5 is a diagram showing a recovery data management table according to the embodiment of the invention.

FIG. 5 is a diagram showing the recovery data management table 207 according to the embodiment of the invention.

The recovery data management table 207 has a data structure for recording backup data of a metadata body, an enable flag for managing that the entry of the recovery data is enabled, and a metadata storage destination address in the memory 25 of each of the own-system controller 22A and the other-system controller 22B.

Each entry of the recovery data management table 207 is associated with metadata to be transferred. Hereinafter, each column of the recovery data management table 207 will be described.

Columns 2071 to 2073 record backup data of metadata. Specifically, the columns 2071 to 2073 record information corresponding to the columns 2061 to 2063 of the metadata management table for each entry.

A column 2074 records whether the recovery data is in an enabled state.

A column 2075 records a metadata storage destination address in the cache area 203A in the own-system controller 22A.

A column 2076 records a metadata storage destination address in the cache area 203B in the other-system controller 22B.

<Read Processing>

Figure 6:
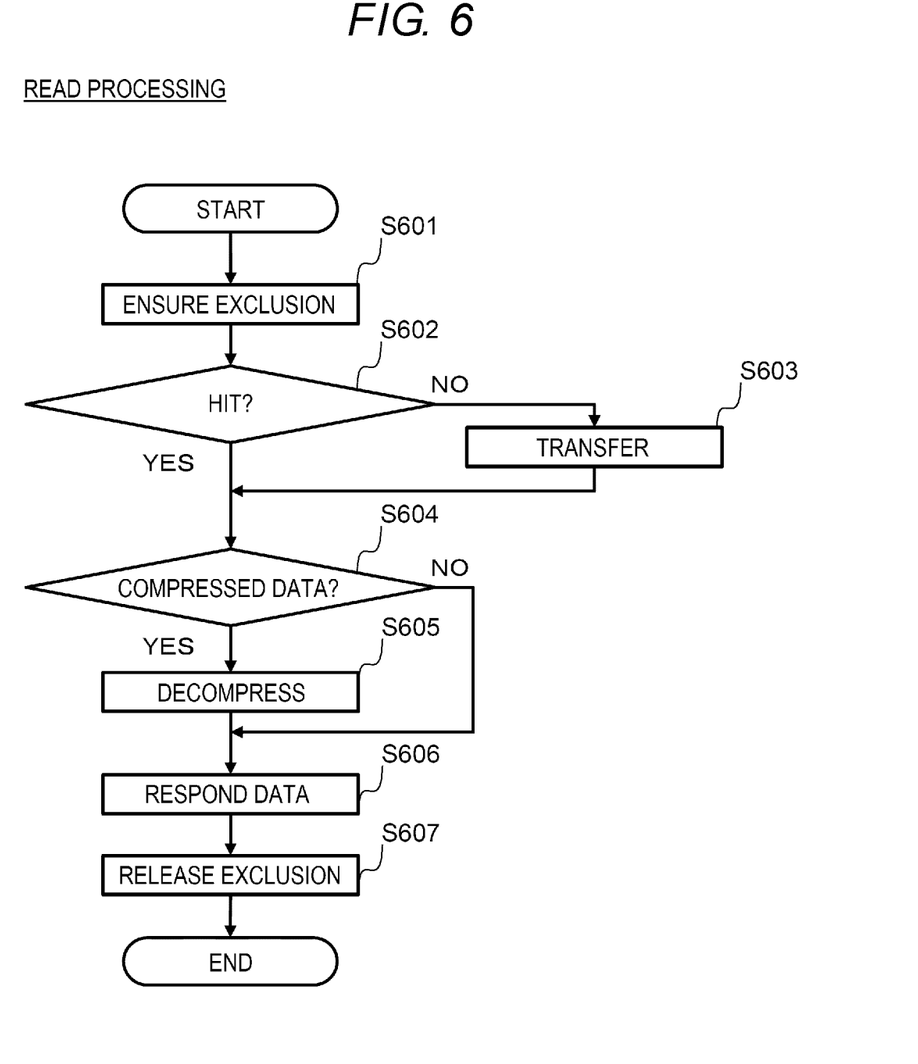
FIG. 6 is a flowchart showing a read processing according to the embodiment of the invention.

FIG. 6 is a flowchart showing a read processing according to the embodiment of the invention.

The read processing starts when the storage apparatus 11 receives a read request from the host computer 40, reads the requested read target data, and transfers the read target data to the host computer 40. In the read request, for example, the LDEV ID, the logical address, and the data size are specified by the host computer 40.

Hereinafter, a processing flow of the read processing will be described with reference to FIG. 6.

S601: The CPU 24 ensures exclusion of a certain unit area (hereinafter referred to as a slot area) of the cache area 203 from the read request information based on the LDEV and the logical address of the read target data. When exclusion of the slot area is ensured by other processing, the CPU 24 waits for a certain period of time and then performs step S601.

S602: The CPU 24 determines whether the read target data is present in the cache area 203. When the determination result is true, the process proceeds to step S604. When the determination result is false, the process proceeds to step S603.

S603: When there is no read target data in the cache area 203, the CPU 24 reads the read target data from the drive 29 and transfers the read target data to the buffer area 202. At this time, the CPU 24 specifies a storage destination physical address of the read target data by referring to the metadata management table 206 corresponding to the LDEV ID based on the LDEV ID and the logical address of the read target data specified by the host computer.

S604: The CPU 24 determines whether the read data in the buffer area 202 is compressed data from a size after compression 2063 of the metadata management table 206. Here, when the LDEV attribute 2052 of the target LDEV is not compression enabled, the determination result is false. When the determination result is true, the process proceeds to step S605. When the determination result is false, the process proceeds to step S606.

S605: The CPU 24 decompresses the compressed data. Instead of being directly performed by the CPU 24, the decompression processing may be performed by dedicated hardware implemented using, for example, an FPGA.

S606: The CPU 24 transfers the read target data in a non-compressed state to the host computer 40.

S607: The CPU 24 releases the exclusion of the ensured slot area.

<Write Processing>

Figure 7:
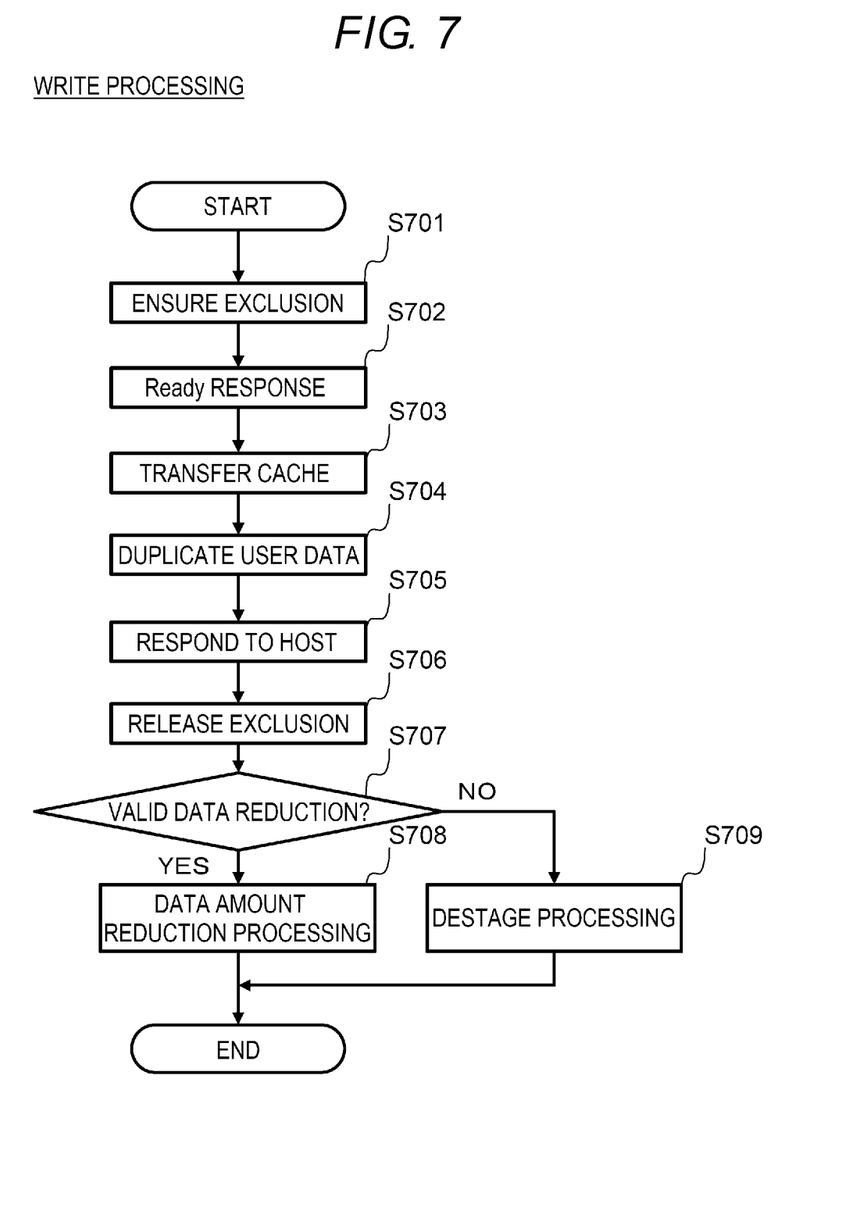
FIG. 7 is a flowchart showing a write processing according to the embodiment of the invention.

FIG. 7 is a flowchart showing a write processing according to the embodiment of the invention.

The write processing starts when the storage apparatus 11 receives a write request from the host computer 40. In the write request, for example, the LDEV ID and the logical address of the write destination are specified by the host computer 40.

Hereinafter, a processing flow of the write processing will be described with reference to FIG. 7. Here, as an example, processing when the storage controller 1_22A of the storage apparatus 11 receives a write request will be described.

S701: The CPU 24A ensures exclusion of a slot area in the cache area 203A based on the LDEV and the logical address of the write destination. When exclusion of the slot area is ensured by other processing, the CPU 24A waits for a certain period of time and then performs step S701. Further, the CPU 24A allocates the slot area of the cache area 203A as the write destination of the data while ensuring the exclusion of the slot area.

S702: The CPU 24A returns to the host computer 40 a response (Ready response) indicating that the preparation for receiving the write processing has been completed. Thereafter, the CPU 24A receives write target data from the host computer 40 that has received the Ready response.

S703: The CPU 24A stores the received write target data in the slot area of the cache area 203A that has already been ensured of the exclusion.

S704: The CPU 24A transfers the write target data stored in the cache area 203A from the storage controller 1_22A to the storage controller 2_22B. The CPU 24B stores the received write target data in the cache area 203B.

S705: The CPU 24A returns a completion response of the write request to the host computer 40.

S706: The CPU 24A releases the exclusion of the slot area ensured in step S701.

S707: The CPU 24A refers to the LDEV management table 205 and determines whether a data reduction setting for the LDEV is enabled based on the value of the LDEV attribute 2052 corresponding to the LDEV to be written. When the data reduction setting is enabled, the process proceeds to step S708. When the data reduction setting is not enabled, the process proceeds to step S709.

S708: The CPU 24A performs data reduction processing (see FIG. 9) as will be described later and completes the processing.

S709: The CPU 24A performs a destage processing (see FIG. 8) as will be described later and completes the processing.

<Destage Processing>

Figure 8:
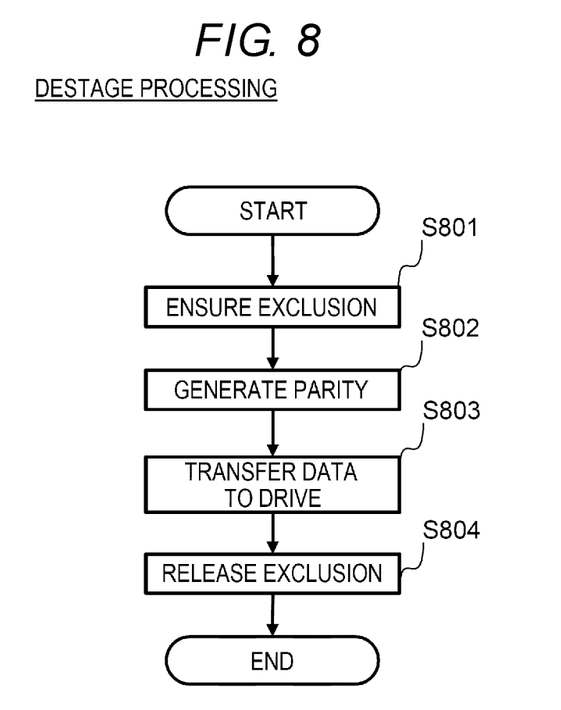
FIG. 8 is a flowchart showing a destage processing according to the embodiment of the invention.

FIG. 8 is a flowchart showing the destage processing according to the embodiment of the invention.

In the destage processing, user data on the cache is written to a specified physical address of the drive 29. In the write processing, the destage processing is performed in step S709 of FIG. 7 after a completion response of the write processing to the storage apparatus 11 is returned to the host computer 40. The destage processing may be performed synchronously or asynchronously (e.g., at regular time intervals) with the write request from the host computer 40.

Hereinafter, a processing flow of the destage processing will be described with reference to FIG. 8.

S801: The CPU 24A ensures exclusion of the slot area including the destage processing target data in the cache area 203A.

S802: The CPU 24A generates parity of the destage target data.

S803: The CPU 24A writes the destage target data and parity data generated in step S802 to the drive 29.

S804: The CPU 24A releases the exclusion of the slot area ensured in step S801 and completes the processing.

<Data Amount Reduction Processing>

Figure 9:
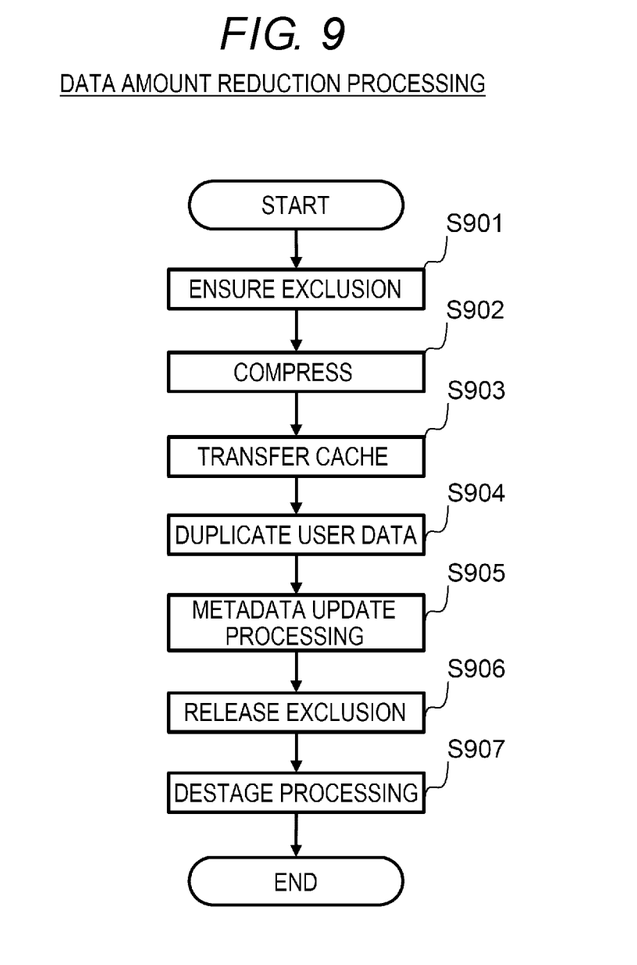
FIG. 9 is a flowchart showing a data amount reduction processing according to the embodiment of the invention.

FIG. 9 is a flowchart showing the data amount reduction processing according to the embodiment of the invention.

In the write processing, the data amount reduction processing is performed in step S708 of FIG. 7 after the completion response of the write request to the storage apparatus 11 is returned to the host computer 40. The data amount reduction processing may be performed synchronously or asynchronously with the write request from the host computer 40.

The compression processing performed in step S903 in FIG. 9 is an example of a predetermined processing performed on the write data. The CPU 24A may perform processing other than compression (e.g., a deduplication processing or an encryption processing). In the present embodiment, the compression processing is performed by the CPU 24A, and may instead be performed by dedicated hardware implemented using, for example, an FPGA.

Hereinafter, a processing flow of the data amount reduction processing will be described with reference to FIG. 9.

S901: The CPU 24A ensures exclusion of the slot area including target data of the data amount reduction processing in the cache area 203A.

S902: The CPU 24A applies the compression processing to the target data of the data amount reduction processing, and stores the obtained compressed data in the buffer area 202A.

S903: The CPU 24A transfers the compressed data in the buffer area 202A to the cache area 203A.

S904: The CPU 24A transfers the compressed data to the cache area 203B.

S905: The CPU 24A performs the metadata update processing (see FIG. 10) as will be described later.

S906: The CPU 24A releases the exclusion of the target slot area.

S907: The CPU 24A performs the destage processing and completes the data amount reduction processing. As described above, the destage processing may be performed synchronously or asynchronously (e.g., at regular time intervals) with the write request from the host computer 40.

<Metadata Update Processing>

Figure 10:
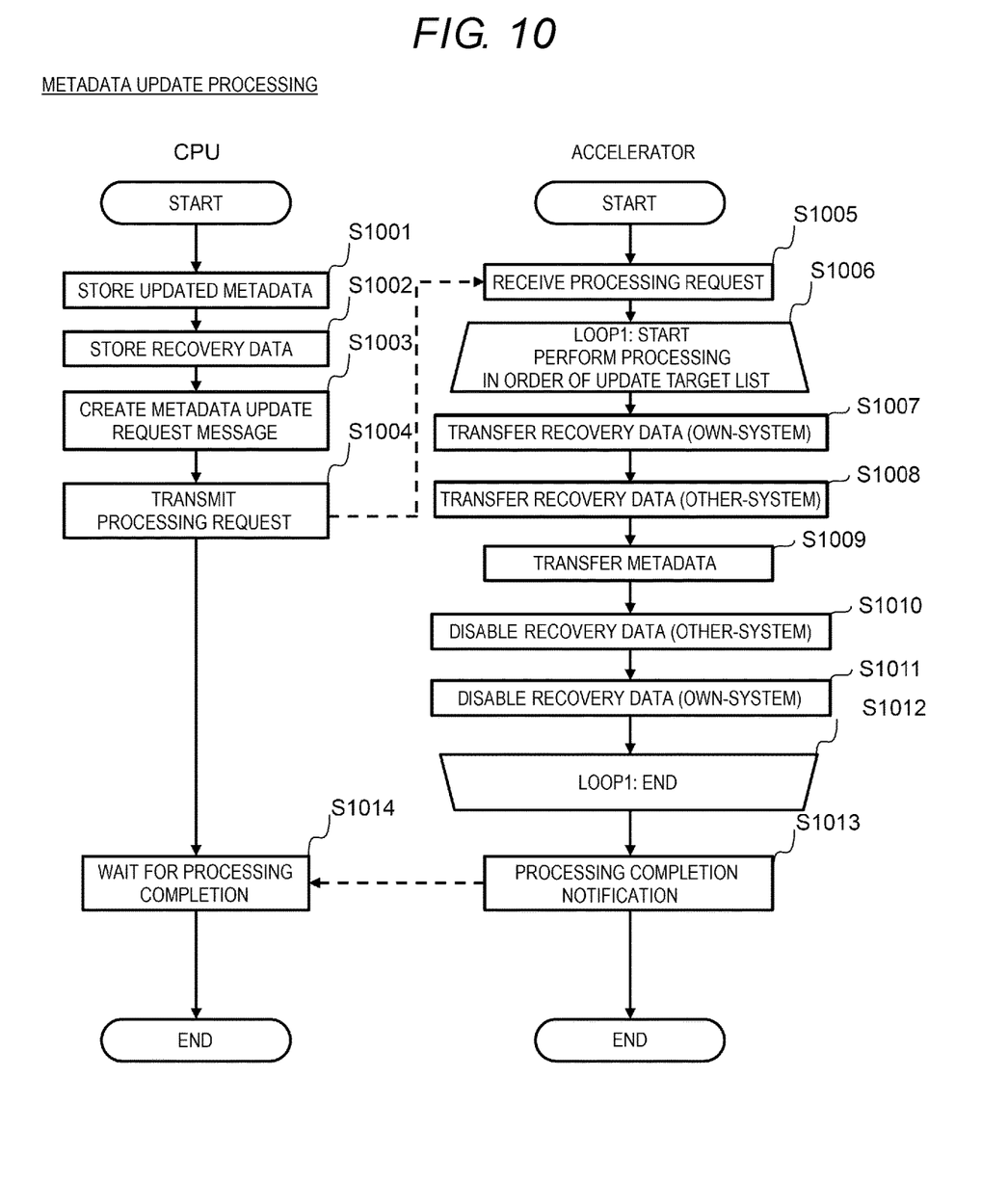
FIG. 10 is a flowchart showing a metadata update processing according to the embodiment of the invention.

FIG. 10 is a flowchart showing the metadata update processing according to the embodiment of the invention.

S1001: The CPU 24A creates the updated metadata 50 and stores the updated metadata 50 in the local memory area 209A.

S1002: The CPU 24A creates the recovery data 51 corresponding to the updated metadata 50, and stores the recovery data 51 in the local memory area 209A. Here, as shown in FIG. 5, the recovery data 51 includes backup data (e.g., the logical address 2071 to the size after compression 2073) of the updated metadata 50, the enable flag 2074, the metadata storage destination address 2075 of the controller 22A, and the metadata storage destination address 2076 of the controller 22B. At this time, the value of the enable flag 2074 is set to "enabled".

S1003: The CPU 24A creates a metadata update request message. The update request message includes a list of update target metadata information. Each element of the list includes an address of the local memory area 209A in which the updated metadata 50 is stored, an address of the local memory area 209A in which the recovery data 51 corresponding to the updated metadata 50 is stored, an updated metadata storage destination address in the cache area 203A of the storage controller 22A, and an updated metadata storage destination address in the cache area 203B of the storage controller 22B.

S1004: The CPU 24A transmits the metadata update processing request to the accelerator 31.

S1005: The accelerator 31 receives the metadata update processing request from the CPU 24A.

S1006: The accelerator 31 performs processing from step S1007 to step S1011 in order from the top of the list of update target metadata.

S1007: The accelerator 31 reads the recovery data 51 from the local memory area 209A of the storage controller 22A. Thereafter, the accelerator 31 stores the recovery data 51 in the recovery data area 208A of the storage controller 22A.

S1008: The accelerator 31 stores the recovery data 51 in the recovery data area 208B of the storage controller 22B.

S1009: The accelerator 31 reads the updated metadata 50 from the local memory area 209A of the storage controller 22A. Thereafter, the accelerator 31 stores the updated metadata 50 in each of the cache area 203A of the storage controller 22A and the cache area 203B of the storage controller 22B based on the specified updated metadata storage destination address.

S1010: The accelerator 31 rewrites the value of the enable flag of the recovery data 51 stored in the recovery data area 208B of the storage controller 22B to "disabled" and disables the recovery data.

S1011: The accelerator 31 rewrites the value of the enable flag of the recovery data 51 stored in the recovery data area 208A of the storage controller 22A to "disabled" and disables the recovery data.

S1012: When an unprocessed element remains in the update target metadata list received from the CPU 24A, the accelerator 31 proceeds to step S1006. When the processing of all elements of the list is completed, the process proceeds to step S1013.

S1013: The accelerator 31 notifies the CPU 24A of an execution result of the metadata update processing.

S1014: The CPU 24A receives the execution result of the metadata update processing from the accelerator 31, and completes the processing.

Thus, by transferring the recovery data to each controller before performing metadata duplication, it is possible to perform roll back or roll forward of the metadata from the recovery data even when the metadata consistency between controllers is lost. As a result, the metadata consistency can be recovered. In addition, since a CPU processing load is collectively reduced by offloading the transfer of the recovery data and the duplication processing of the metadata from the CPU to the accelerator, the improvement of the I/O processing performance of the storage system can be expected.

<Metadata Recovery Processing>

Figure 11:
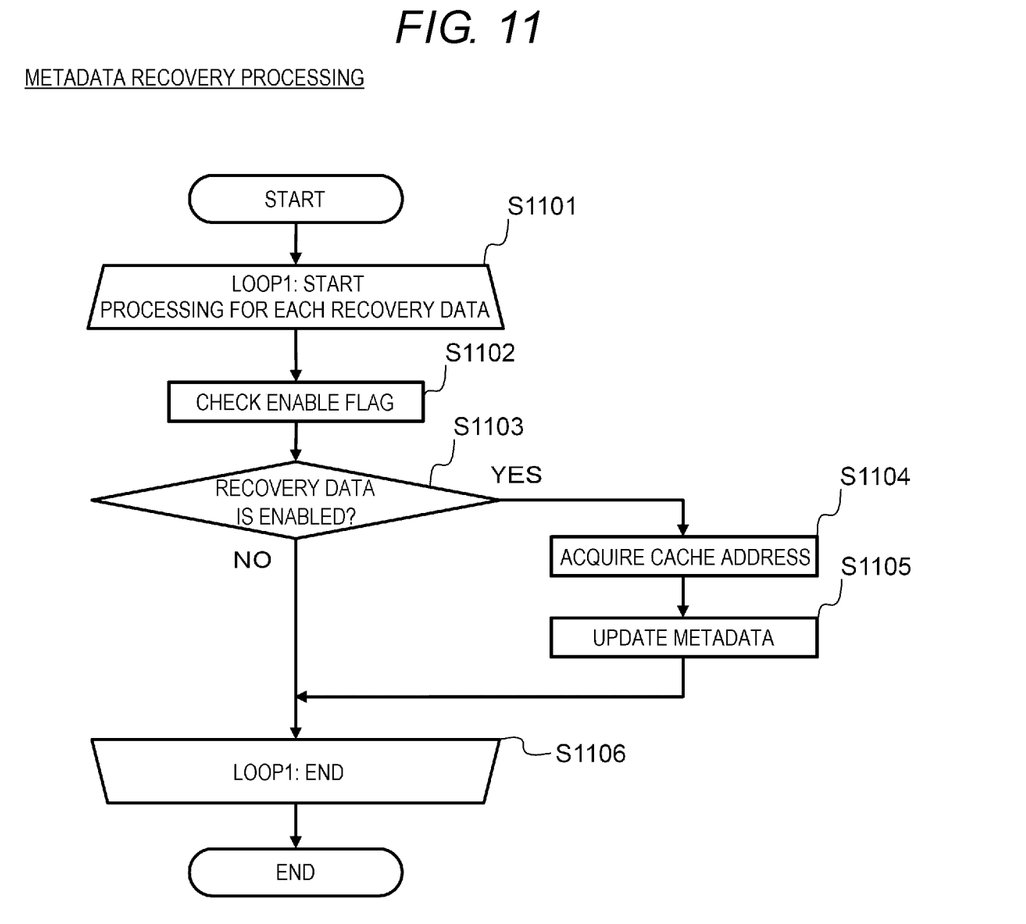
FIG. 11 is a flowchart showing a metadata recovery processing according to the embodiment of the invention.

FIG. 11 is a flowchart showing the metadata recovery processing according to the embodiment of the invention.

The metadata recovery processing is performed when the metadata update processing is not completed due to an external factor (e.g., disconnection between controllers). By applying roll forward or roll back to the metadata based on the recovery data stored in the memory, contents of the metadata are returned to a state of matching between both controllers. The metadata recovery processing is performed by both controllers.

Hereinafter, a processing flow of the recovery processing will be described with reference to FIG. 11. Here, a method using roll forward will be described.

S1101: The CPU 24 performs processing from step S1102 to step S1107 on each entry in the recovery data management table 207 of the recovery data area 208.

S1102: The CPU 24 refers to the enable flag 2074 in the target recovery data entry.

S1103: The CPU 24 determines whether the value of the enable flag 2074 referred to in S1102 is "enabled". When the value of the enable flag 2074 is "enabled", it is not guaranteed that the metadata corresponding to the recovery data is updated. That is, in this case, the consistency of the duplicated metadata between the own-system storage controller 22 and the other-system storage controller 22 may lose. For this reason, the metadata is set as a roll-forward target. When the value of the enable flag 2074 is "disabled", since the metadata corresponding to the recovery data is in an updated state, the metadata consistency is ensured and the roll forward is unnecessary. When the determination result is true, the process proceeds to step S1104. When the determination result is false, the process proceeds to step S1106.

S1104: The CPU 24 refers to the recovery data management table 207 and acquires the metadata storage destination addresses 2075 and 2076 of the entry.

S1105: The CPU 24 copies the metadata backup information (the logical address 2071, the physical address 2072, the size after compression 2073) of the entry of the recovery data management table 207 to the metadata storage destination address acquired in S1104. When the copy is completed, the value of the enable flag of the entry is set to "disabled".

S1106: When an unprocessed entry remains in the recovery data management table, the CPU 24 proceeds to step S1101 to perform the same processing for the next entry. If no unprocessed entry remains, the recovery processing is completed.

The method of recovering the metadata consistency using the roll forward has been described above.

A method using roll back can also be implemented by changing a part of the processing of the present embodiment as follows.

Specifically, in step S1002 of the metadata update processing, the metadata before update is stored in the recovery data 51 instead of the metadata after update.

In addition, an implementation order of steps S1010 and S1011 is replaced. Specifically, the accelerator 31 rewrites the enable flag 2074 of the recovery data 51 stored in the recovery data area 208A of the storage controller 22A to "disabled", and then rewrites the enable flag 2074 of the recovery data 51 stored in the recovery data area 208B of the storage controller 22B to "disabled".

When the roll back is performed, the metadata corresponding to the recovery data whose enable flag 2074 is "enabled" is rewritten to the metadata before update. At this time, by rewriting the enable flag 2074 in the above order, the own-system storage controller 22A directly responsible for the I/O processing preferentially holds the updated metadata.

By changing the processing as described above, since the metadata restored in step S1105 of the metadata recovery processing becomes the metadata before update, the roll back can be implemented.

According to the embodiment of the invention described above, when a failure occurs, each storage controller performs roll forward or roll back of the metadata update processing, thereby maintaining the metadata consistency. Therefore, in the metadata update processing, firstly, information (recovery data) necessary for roll forward or roll back is stored in the memory of each storage controller, and then the metadata is duplicated. When the metadata update processing is abnormally completed, each storage controller recovers the metadata consistency by performing roll forward or roll back of the metadata based on the recovery data. Further, by offloading the transmission of the recovery data and the metadata duplication to the hardware accelerator, the CPU processing load of the storage controller is reduced, and the processing performance of the storage system is improved.

The system according to the embodiment of the invention may be configured as follows.

(1) The storage system includes a plurality of storage control units (e.g., the storage controller 22), an accelerator (e.g., the accelerator 31), and a storage drive (e.g., the drive 29) having a storage medium for storing data. Each of the plurality of storage control units includes a processor (e.g., the CPU 24) and a memory (e.g., the memory 25). Metadata (e.g., the metadata management table 206) for accessing the data stored in the storage drive is held in a memory of a first storage control unit among the plurality of storage control units and a memory of a second storage control unit among the plurality of storage control units. When a write request for updating the stored data is received, a processor of the first storage control unit generates metadata obtained by updating metadata related to the data to be updated and recovery data (e.g., the recovery data management table 207) including information for recovering metadata consistency (e.g., steps S1001 and S1002), and transmits a processing request for the metadata and the recovery data to the accelerator (e.g., step S1004). The accelerator stores the recovery data in the memory of the first storage control unit and the memory of the second storage control unit based on the processing request and then (e.g., steps S1007 and S1008) stores the metadata in the memory of the first storage control unit and the memory of the second storage control unit (e.g., steps S1009).

As a result, in the storage system adopting the write-once data storage method, it is possible to improve the I/O processing performance while maintaining data consistency.

(2) In (1), the accelerator disables the recovery data in the memory of the first storage control unit and the recovery data in the memory of the second storage control unit after storing the metadata in the memory of the first storage control unit and the memory of the second storage control unit (e.g., steps S1010 and S1011), and the processor of the first storage control unit and the processor of the second storage control unit recover the metadata consistency based on the enabled recovery data when the storage of at least a part of the metadata in the memory is not normally completed (e.g., steps S1102 to S1106).

As a result, the metadata can be recovered to a state in which consistency is ensured.

(3) In (2), the recovery data includes information for recovering the metadata to a state after update, and the accelerator disables the recovery data in the memory of the second storage control unit (e.g., step S1010) after storing the metadata in the memory of the first storage control unit and the memory of the second storage control unit (e.g., step S1009), and then disables the recovery data in the memory of the first storage control unit (e.g., step S1011).

As a result, the metadata can be rolled forward to a state in which consistency is maintained.

(4) In (2), the recovery data includes information for restoring the metadata to a state before update, and the accelerator disables the recovery data in the memory of the first storage control unit (e.g., step S1011) after storing the metadata in the memory of the first storage control unit and the memory of the second storage control unit (e.g., step S1009), and then disables the recovery data in the memory of the second storage control unit (e.g., step S1010).

As a result, the metadata can be rolled back to a state in which consistency is maintained.

(5) In (1), the metadata includes a correspondence relationship between a write destination logical address and a write destination physical address for accessing the data, and a case where the correspondence relationship between the write destination logical address and the write destination physical address is updated is a case where a data amount reduction processing of the data to be written is performed.

As a result, the data consistency can be maintained in the storage system adopting the write-once data storage method.

(6) In (5), the data amount reduction processing is a compression processing or a deduplication processing.

As a result, the data consistency can be maintained in the storage system adopting the write-once data storage method.

The invention is not limited to the embodiment described above, and includes various modifications. For example, the above embodiment has been described in detail for better understanding of the invention, and is not necessarily limited to those including all the configurations described above. A part of the configuration of one embodiment can be replaced with the configuration of another embodiment, and the configuration of another embodiment can be added to the configuration of one embodiment. In addition, a part of the configuration of each embodiment may be added, deleted, or replaced with another configuration.

A part or all of the above configurations, functions, processing units, processing methods, and the like may be implemented by hardware, for example, by designing an integrated circuit. In addition, each of the above configurations, functions, and the like may be implemented by software by a processor interpreting and executing a program for implemented each function. Information such as a program, a table, and a file for implemented each function can be stored in a storage device such as a nonvolatile semiconductor memory, a hard disk drive, and a solid state drive (SSD), or in a computer-readable non-transitory data storage medium such as an IC card, an SD card, and a DVD.

In addition, control lines and information lines that are considered to be necessary for description are shown, but not all control lines or information lines in a product have necessarily been shown. Actually, it may be considered that almost all the configurations are connected to each other.

What is claimed is:

1. A storage system comprising:
a plurality of storage control units;
an accelerator; and
a storage drive having a storage medium for storing data, wherein
each of the plurality of storage control units includes a processor and a memory,
metadata for accessing the data stored in the storage drive is held in a memory of a first storage control unit among the plurality of storage control units and a memory of a second storage control unit among the plurality of storage control units,
when a write request for updating the stored data is received, a processor of the first storage control unit
performs a data amount reduction processing of the data to be updated,
updates, by the data amount reduction processing, metadata related to the data to be updated, and
transmits the updated metadata and a processing request for the updated metadata to the accelerator, and
the accelerator stores the updated metadata in the memory of the first storage control unit and the memory of the second storage control unit based on the processing request for the updated metadata.

2. The storage system according to claim 1, wherein
the processor of the first storage control unit transmits, in addition to the metadata, the recovery data including information for recovering metadata consistency and a processing request for the recovery data to the accelerator, and
the accelerator stores the recovery data in the memory of the first storage control unit and the memory of the second storage control unit based on the processing request for the recovery data.

3. The storage system according to claim 2, wherein
the accelerator disables the recovery data in the memory of the first storage control unit and the recovery data in the memory of the second storage control unit after storing the metadata in the memory of the first storage control unit and the memory of the second storage control unit, and
the processor of the first storage control unit and the processor of the second storage control unit recover the metadata consistency based on enabled recovery data when storage of at least a part of the metadata in the memory of the first storage control unit and the memory of the second storage control unit is not normally completed.

4. The storage system according to claim 3, wherein
the recovery data includes information for recovering the metadata to a state after the update of the metadata,
the accelerator disables the recovery data in the memory of the second storage control unit after storing the metadata in the memory of the first storage control unit and the memory of the second storage control unit, and then disables the recovery data in the memory of the first storage control unit.

5. The storage system according to claim 3, wherein
the recovery data includes information for recovering the metadata to a state before the update of the metadata, and
the accelerator disables the recovery data in the memory of the first storage control unit after storing the metadata in the memory of the first storage control unit and the memory of the second storage control unit, and then disables the recovery data in the memory of the second storage control unit.

6. The storage system according to claim 1, wherein
the metadata includes a correspondence relationship between a write destination logical address and a write destination physical address for accessing the data, and
the correspondence relationship is updated by the data amount reduction processing of the data to be written is performed.

7. The storage system according to claim 6, wherein
the data amount reduction processing is a compression processing or a deduplication processing.

8. A control method of a storage system including a plurality of storage control units, an accelerator, and a storage drive having a storage medium for storing data, wherein
each of the plurality of storage control units includes a processor and a memory,
metadata for accessing the data stored in the storage drive is held in a memory of a first storage control unit among the plurality of storage control units and a memory of a second storage control unit among the plurality of storage control units, and
the control method comprising the steps of:
when a write request for updating the stored data is received, a processor of the first storage control unit performing, by a processor of the first storage control unit, a data amount reduction processing of the data to be updated,
updating, by a processor of the first storage control unit, by the data amount reduction processing, metadata related to the data to be updated, and
transmitting, by a processor of the first storage control unit, the updated metadata and a processing request for the updated metadata to the accelerator, and
storing, by the accelerator, the updated metadata in the memory of the first storage control unit and the memory of the second storage control unit based on the processing request for the updated metadata.

9. The control method of the storage system according to claim 8, wherein the control method further comprises the steps of:
transmitting, by the processor of the first storage control unit, in addition to the metadata, the recovery data including information for recovering metadata consistency and a processing request for the recovery data to the accelerator, and
storing, by the accelerator, the recovery data in the memory of the first storage control unit and the memory of the second storage control unit based on the processing request for the recovery data.

10. The control method of the storage system according to claim 9, wherein the control method further comprises the steps of:
disabling, by the accelerator, the recovery data in the memory of the first storage control unit and the recovery data in the memory of the second storage control unit after storing the metadata in the memory of the first storage control unit and the memory of the second storage control unit, and
recovering, by the processor of the first storage control unit and a processor of the second storage control unit, the metadata consistency based on enabled recovery data when storage of at least a part of the metadata in the memory of the first storage control unit and the memory of the second storage control unit is not normally completed.

11. The control method of the storage system according to claim 10, wherein
the recovery data includes information for recovering the metadata to a state after the update of the metadata, and
the accelerator disables the recovery data in the memory of the second storage control unit after storing the metadata in the memory of the first storage control unit and the memory of the second storage control unit, and then disables the recovery data in the memory of the first storage control unit.

12. The control method of the storage system according to claim 10, wherein
the recovery data includes information for recovering the metadata to a state before the update of the metadata, and
the accelerator disables the recovery data in the memory of the first storage control unit after storing the metadata in the memory of the first storage control unit and the memory of the second storage control unit, and then disables the recovery data in the memory of the second storage control unit.

13. The control method of the storage system according to claim 8, wherein
the metadata includes a correspondence relationship between a write destination logical address and a write destination physical address for accessing the data, and
the correspondence relationship is updated by the data amount reduction processing of the data to be written is performed.

14. The control method of the storage system according to claim 13, wherein
the data amount reduction processing is a compression processing or a deduplication processing.

* * * * *